United States Patent [19]

Higgins

[11] Patent Number: 5,756,963
[45] Date of Patent: May 26, 1998

[54] SATURATION SENSING POWER SOURCE AND RELATED METHODS FOR A WELDING OR CUTTING SYSTEM

[75] Inventor: Philip K. Higgins, Society Hill, S.C.

[73] Assignee: The ESAB Group, Inc., Florence, S.C.

[21] Appl. No.: 608,713

[22] Filed: Feb. 29, 1996

[51] Int. Cl.$^6$ .................................................. B23K 9/10
[52] U.S. Cl. .............................. 219/137 PS; 219/130.21; 219/130.33
[58] Field of Search ..................... 219/137 PS, 130.21, 219/130.31, 130.32, 130.33, 130.51; 363/124.6

[56] References Cited

U.S. PATENT DOCUMENTS

| | | | |
|---|---|---|---|
| 4,349,720 | 9/1982 | Makimaa | 219/130.33 |
| 4,469,933 | 9/1984 | Mizuno et al. | 219/137 PS |
| 4,479,046 | 10/1984 | Mizuno et al. | 219/130.32 |
| 4,870,248 | 9/1989 | Gilliland | 219/137 PS |

OTHER PUBLICATIONS

*Instructions for SVI–400 Welding Power Supply*, Linde Union Carbide, L11-910-F, Jul., 1982, pp. 1–16.

Catalog, *Acme Transformer*, Acme Transformer, Division of Acme Electric Corporation, 1987.

*L–TEC Parts List*, Plasma Arc Welding and Cutting Products, Sheet PR 175, 10–A, p. 3, Jul. 15, 1987.

*Electrical Connection Diagrams*, Acme Transformer, Division of Acme Electric Corporation, B–111704–B.

*Buck and Boost Transformer Installation Instructions*, Acme Transformer, Division of Acme Electric Corporation, A–22497–F.

*Electrical Connection Diagrams*, Acme Transformer, Division of Acme Electric Corporation, B–111703–B.

*Buck and Boost Transformer Installation Instructions*, Acme Transformer, Division of Acme Electric Corporation, A–36715–E.

*Instructions for PCM–82i & 84i Plasma Arc Cutting Packages*, L–TEC Welding & Cutting Systems, F–14–375–A, Feb., 1989, pp. 1–16.

*Instructions for Digipulse 450 Pulsed MIG Welding System*, L–TEC Welding & Cutting Systems, F–14–350, Jul., 1986, pp. 1–28.

*Instructions for Linde Trimpower 300 SVI*, P/N 679370, L–TEC Welding & Cutting Systems, WCSF–14–249, Sep., 1985, pp. 1–16.

*SVI 300i cvcc Power Source Instruction Manual*, ESAB Welding & Cutting Products, F–15–183, Nov., 1994, pp. 1–32.

*Instruction Manual SVI 450i cvcc Power Source*, ESAB Welding & Cutting Products, F–15–071–B, Jun., 1995, pp. 1–34.

*Instruction Manual Digipulse 450i Power Source*, ESAB Welding & Cutting Products, F–15–014–B, Apr., 1995, pp. 1–32.

*ESP Ultra–Life 300 Cutting Power Source Maintenance Manual*, P/N 33520, F–15–141A, May, 1994.

(List continued on next page.)

*Primary Examiner*—Clifford C. Shaw
*Attorney, Agent, or Firm*—Bell Seltzer Intellectual Property Group of Alston & Bird, LLP

[57] ABSTRACT

A power source for a welding or cutting system is provided which preferably includes a power switching circuit, a switching cessation detector, and overshoot reducing means. The power switching circuit switches electrical power to provide an electrical power output signal of the power source to an electric arc tool operatively coupled thereto. The switching cessation detector is responsive to the power switching circuit. The cessation detector generates a switching cessation signal responsive to detecting electrical power being supplied to an electric arc tool operatively coupled to the power source when the power switching circuit ceases switching. The overshoot reducing means is responsive to the switching cessation signal and reduces excess current output from the power switching circuit upon resumption of switching. Related methods are also discussed.

24 Claims, 6 Drawing Sheets

OTHER PUBLICATIONS

*Section 4 Troubleshooting*, ESP Ultra–Life 300 Power Source, The ESAB Group, Inc., F–15–141A, Apr., 1994, pp. 29–41.

*Hypertherm*, Instruction Manual IM–41 H–401 and H–601 Power Supply, Hypertherm, Incorporated, Oct., 1980, pp. 1–27.

*ESP–400 Cutting Power Source Maintenance Manual*, P/N 33518, F–15–108, Jul., 1993, pp. 1–27.

*ESP–600 Cutting Power Source Maintenance Manual*, F–15–109, Jun., 1993, pp. 1–26.

*ESP Ultra–Life 300 Cutting Power Source Maintenance Manual*, P/N 33520, ESAB Welding & Cutting Products, F–15–141A, Mar., 1996.

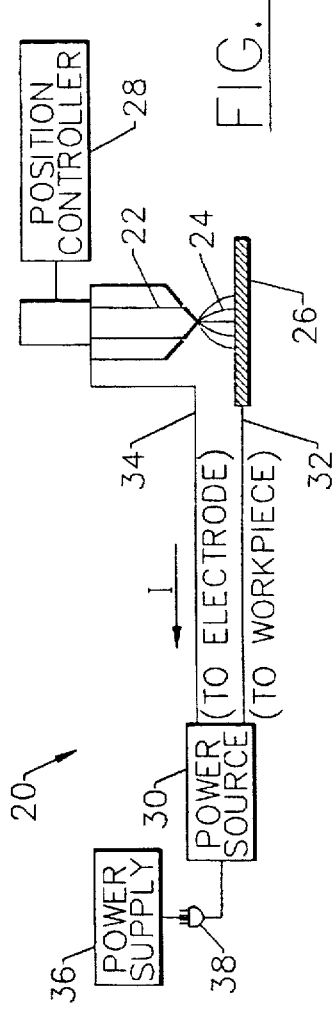
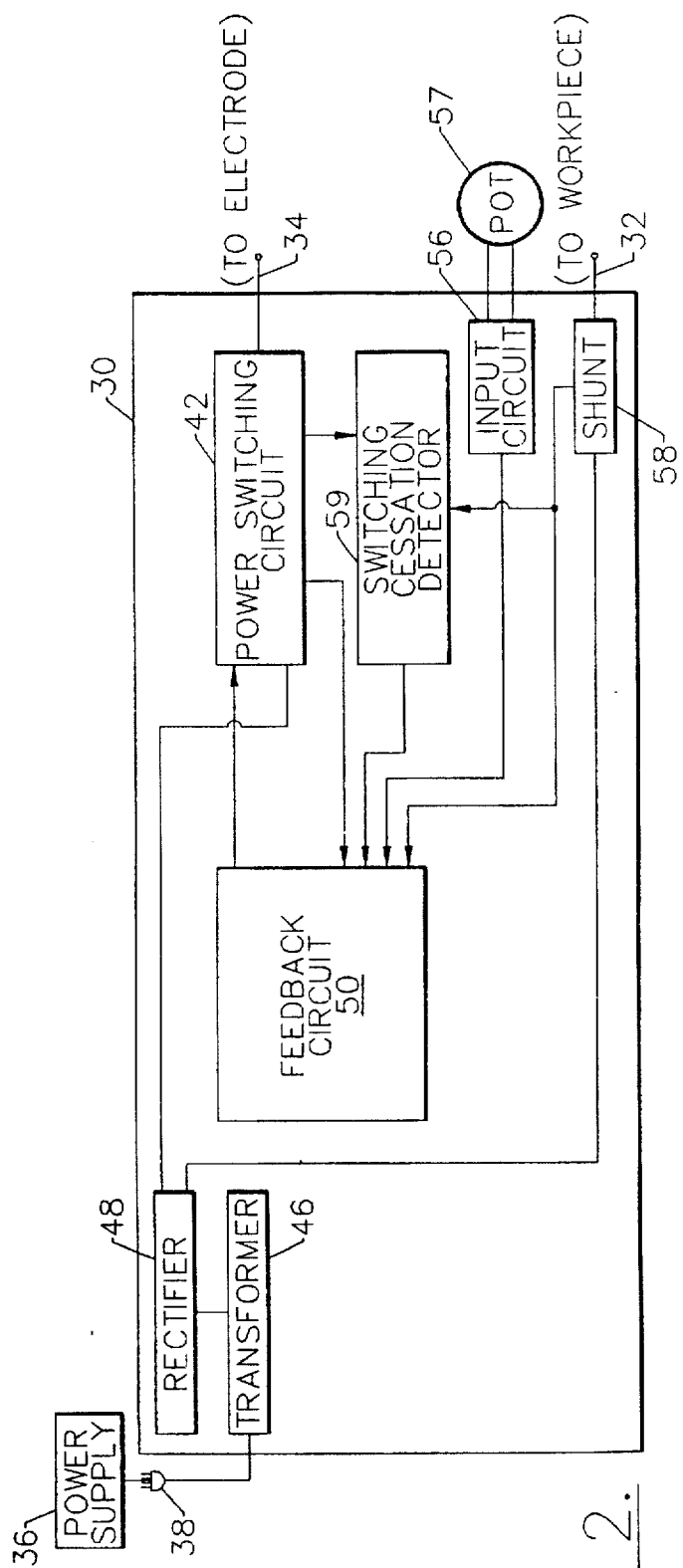

SATURATION SENSING POWER SOURCE AND RELATED METHODS FOR A WELDING OR CUTTING SYSTEM

FIELD OF THE INVENTION

The present invention relates to the field of power sources, and more particularly to the field of power sources for electric arc welding and cutting systems.

BACKGROUND OF THE INVENTION

Many welding and cutting systems use an electric arc to generate heat. For example, a plasma cutting system uses an electric arc to cut a metal workpiece with a high degree of precision. Generally, a cathode of an electric arc tool is positioned over the metal workpiece to be cut, and an electric potential is generated between the two. When the potential between the two reaches a critical level, an electric arc is generated. The electrical potential is typically generated by a power source which switches electrical power to the cathode at a predetermined frequency with the duty cycle of switching being used to control the electrical power delivered to the cathode.

Within limits, the voltage drop of the electric arc is approximately a function of the arc length, regardless of the current. Accordingly, the voltage drop across the arc changes. For example, the voltage drop changes as the electric arc cuts through the workpiece lengthening the arc; as the electric arc moves to an uncut portion of the workpiece shortening the arc; and as the electric arc encounters irregularities along the surface of the workpiece. The voltage drop across the electric arc is limited by the maximum voltage output for the power source at the current desired.

The current through the arc is a function of the voltage drop across the arc and the duty cycle at which the power source is switching the electrical power. Accordingly, to maintain a constant arc current, the duty cycle of power source switching must increase if the arc voltage increases. The duty cycle, however, can only increase to 100%, at which point the arc current will rapidly drop with further increases in arc voltage. Stated in other words, the power source is unable to deliver the desired current. This condition is known as power source saturation and may be associated with ineffective cutting of the workpiece or damage to the workpiece or cutting tool.

During power source saturation, the power source may sense that the actual current through the arc is less than desired, and thus try to increase the current output. As long as the power source is saturated, any attempt to increase the output current to the desired current will be ineffective. If the voltage drop across the electric arc then drops, however, the power source may overshoot the desired current output as a result of the large difference sensed between the actual and desired current outputs during saturation. This current overshoot may cause damage to both the electric arc tool and the workpiece.

OBJECTS AND SUMMARY OF THE INVENTION

It is therefor an object of the present invention to provide a power source for a welding or cutting system having increased performance capabilities.

It is another object of the present invention to provide a power source for a welding or cutting system which can detect power source saturation.

It is still another object of the present invention to provide a power source for a welding or cutting system which can recover from power source saturation without significantly overshooting a desired output current.

These and other objects are provided according to the present invention by a power source including a power switching circuit, a switching cessation detector, and overshoot reducing means. The power switching circuit switches electrical power to an electric arc tool operatively connected thereto. The switching cessation detector generates a switching cessation signal responsive to detecting that electrical power is being supplied to the electric arc tool when the power switching circuit ceases switching. The overshoot reducing means is responsive to the switching cessation signal and reduces excess current output from the power switching circuit upon resumption of switching.

Accordingly, the switching cessation signal is only generated when electrical power is being supplied without switching the power switching circuit. Stated in other words, the switching cessation signal is generated when the power switching circuit is switching with a 100% duty cycle, and in this situation, the power source is saturated. The overshoot reducing means thus reduces current overshoot when power source saturation subsides (such as when the arc length decreases upon moving the electrode) and the power switching source resumes switching.

Preferably, the power switching circuit includes a switch for switching the electrical power at a predetermined switching frequency, and the switching cessation detector includes a timer for inhibiting generation of the switching cessation signal until at least two consecutive switching periods have passed without switching. Accordingly, brief self-correcting occurrences of power source saturation will not unnecessarily hinder operation of the plasma cutting tool. Furthermore, the occurrence of false switching cessation signals can be reduced.

In particular, the switching cessation detector can include means for generating an AC component magnitude signal responsive to an AC component of the switched electrical power, and the timer can include a resistor-capacitor circuit coupled to the generating means. The resistor-capacitor circuit has a predetermined time constant so that the AC component magnitude signal only decays to a predetermined threshold level after at least two switching periods have passed without switching. In addition, the number of switching periods required to pass without switching can be varied by choosing resistor-capacitor combinations having different time constants.

The power source of the present invention thus provides a cost effective means for quickly detecting power source saturation and for reducing output current overshoot. Accordingly, the effects of power source saturation can be reduced.

BRIEF DESCRIPTION OF THE DRAWINGS

FIG. 1 is a block diagram of a plasma cutting system including a power source according to the present invention.

FIG. 2 is a block diagram of a power source according to the present invention.

DETAILED DESCRIPTION

Figure 3:
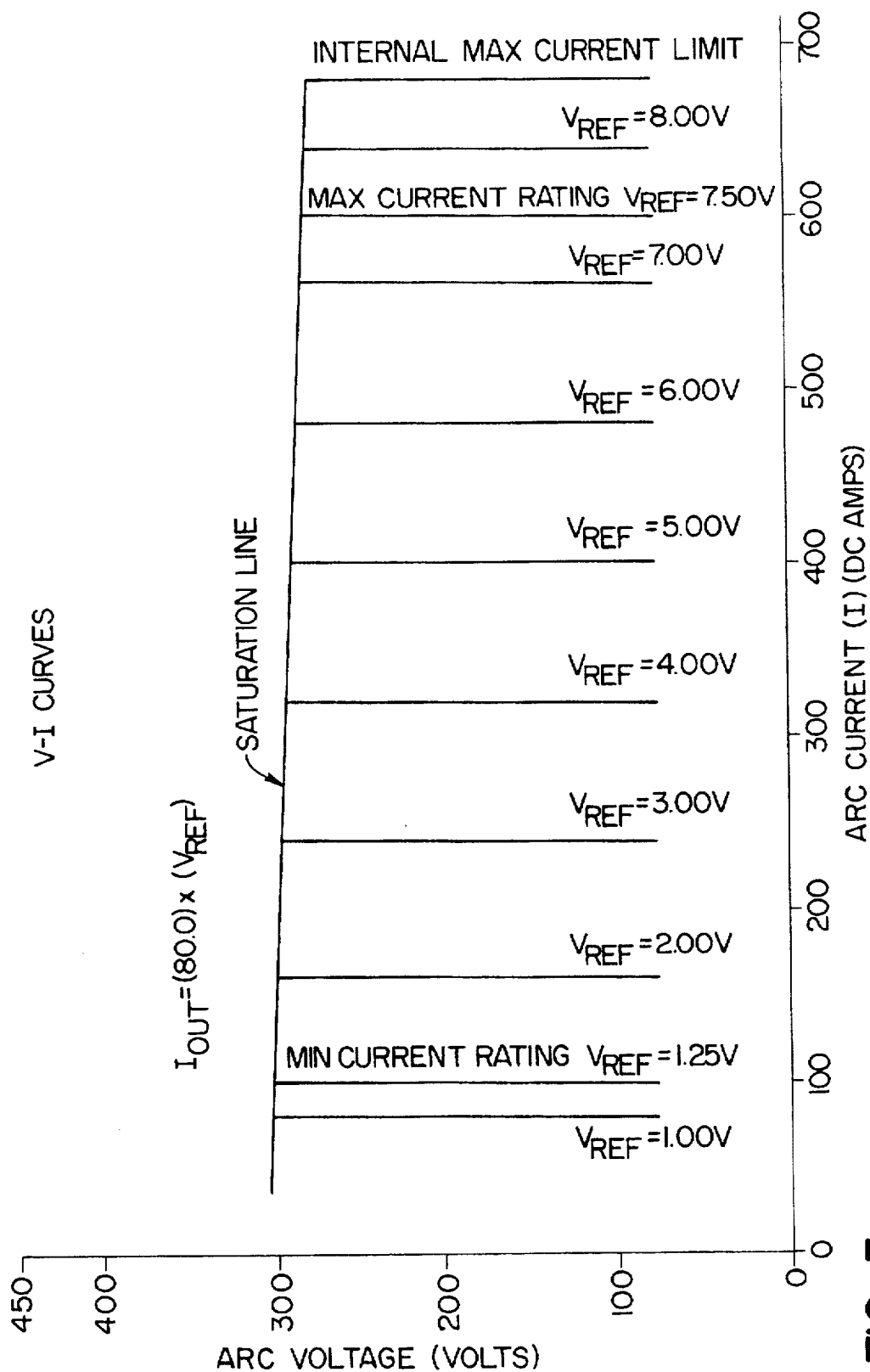
FIG. 3 is a graph illustrating voltage-current curves for a power source according to the present invention.

The present invention will now be described more fully hereinafter with reference to the accompanying drawings in which preferred embodiments of the invention are shown. This invention may, however, be embodied in many different forms and should not be construed as limited to the illustrated embodiments set forth herein; rather, these embodiments are provided so that this disclosure will be thorough and complete and will fully convey the scope of the invention to those skilled in the art. Like numbers refer to like elements throughout.

In an arc welding or cutting system according to the present invention, an electrode 22 of an electric arc tool is used to generate an electric arc 24 between itself and the workpiece 26, as best shown in FIG. 1. In the illustrated plasma cutting system 20, the electric arc 24 delivers sufficient energy to the workpiece 26 that the workpiece is cut. By moving the electrode 22 relative to the workpiece 26, using the position controller 28, the workpiece 26 can be cut to a predetermined shape.

The power source 30 provides the electrical power used to generate the electric arc 24 between the electrode 22 and the workpiece 26. The power source preferably generates a relatively high voltage at the first output 32 which is connected to the workpiece 26, and the power source preferably generates a relatively low voltage at the second output 34 which is connected to the electrode 22. For purposes of discussion, the workpiece 26 can be considered to be grounded so that a negative potential is generated at power source output 34. Accordingly, current flows from the power source 30 to the workpiece 26, across the electric arc 24, to the electrode 22 and back to the power source 30.

Electrical power is in turn provided to the power source 30 by an external power supply 36 such as a conventional 460 volt three-phase power supply from a utility company. The power source 30 and power supply 36 can be connected by any conventional power connection 38 known to those having skill in the art. For example, the power connection 38 can be a removable plug or a hard wired connection.

The major components of a power switching source 30 according to the present invention are best illustrated in FIG. 2. Electrical power from the power supply 36 is coupled through the power connection 38 to the transformer 46. The transformed electrical power is rectified by the rectifier 48 which is in turn coupled with the power switching circuit 42. The rectified electrical power is switched by the power switching circuit 42 to provide electrical power for the electric arc 24. Although one power switching circuit 42 is shown in FIG. 2, multiple power switching circuits can be connected in parallel as discussed for example in copending application Ser. No. 08/608,748 entitled "Power Source Including Parallel Switching Circuits And Related Methods for a Welding or Cutting System" filed Feb. 29, 1996 and naming the inventor of the present invention, the disclosure of which is hereby incorporated herein in its entirety by reference.

The feedback circuit 50 controls the switching of the power switching circuit 42 by generating an input signal responsive to the VREF signal from the input circuit 56, the feedback signal from the power switching circuit 42, and the arc current as sensed at the shunt 58. Each of these elements is illustrated in greater detail in FIG. 4. In particular, the power switching circuit 42 includes a switch 63 such as an insulated gate bipolar transistor (IGBT) which switches the rectified power from the rectifier 48. This switch switches on and off at a predetermined frequency in response to a switch drive signal generated by the timing signal generator 80, ramp generator 84, comparator 86, and switch drive 88 responsive to the input signal generated by the feedback circuit 50. The duty cycle of this switching together with the load characteristics of the electric arc determine the average current delivered to the electric arc.

In particular, the arc voltage is approximately a function of the arc length which can change, for example, as the arc 24 cuts into the workpiece 26, and as the arc moves across the workpiece. In order to maintain a relatively constant output current, the duty cycle of switching must change as the arc voltage changes. As the arc voltage increases, however, the duty cycle of switching can only increase to 100% at which point the output current will drop rapidly with further increases in arc voltage. Stated in other words, at any given desired current output for the power source 30 there is a maximum voltage output beyond which the desired current output cannot be maintained. Power source saturation occurs when the duty cycle of switching goes to 100% (i.e., the switch 63 is constantly on and therefor ceases switching).

Voltage-current curves (V-I Curves) for a power source according to the present invention are graphically illustrated in FIG. 3. Although these particular curves were generated for a power source having two parallel power switching circuits, one having skill in the art will understand that the same principles apply to a power source having a single power switching circuit. Each of the vertical lines represents a current output corresponding to a magnitude of the VREF signal from the input circuit 56. In particular, the current output from the power source 30 (arc current) is equal to 80 X VREF for arc voltages less than the maximum output voltage for the power source.

At any given output current, the arc voltage can vary from approximately 75 volts up to the maximum output voltage for the power source, depending on the arc length. Should the arc voltage reach the maximum voltage for the power source at the desired current, the switching duty cycle will go to 100% meaning that the switch will turn on and cease switching. This condition is known as power source saturation. The saturation line shows the maximum voltage output for the power source at which point saturation will occur.

In order to reduce the effects of power source saturation, the power source 30 of the present invention includes a switching cessation detector 59 which is operatively connected to the power switching circuit 42 and shunt 58, as shown in FIG. 2. The switching cessation detector 59 detects when both the power switching circuit 42 ceases switching and current is flowing through the electric arc (as monitored at shunt 58). When power is flowing through the shunt 58 but the power switching circuit 42 has ceased switching, the power source is in saturation. Accordingly, the switching cessation detector 59 generates a switching cessation signal, and the feedback circuit 50 resets the error signal from operational amplifier 74 to indicate that there is no error. In particular, the operational amplifier can feed the VREF signal from the input circuit 56 straight through to the summing circuit. Furthermore, the VREF signal can be attenuated by 20%, for example, so that the power source will attempt to attain an even lower current than that indicated by VREF. Thus, power source saturation can be quickly detected and current overshoot reduced.

Significant aspects of the power source 30 circuitry are discussed with reference to FIG. 4 and the associated timing diagrams of FIG. 5. As previously discussed, the power supply 36 can be a 460 volt 3-phase supply which is coupled to the 3-phase transformer 46 of the power source. The transformed power can then be rectified by the 3-phase rectifier 48 including rectifying diodes 60, and the output from the diodes can be conditioned by a capacitor 62 (or capacitor bank) which is connected in parallel with the rectifying diodes. A first output from the rectifier 48 can be provided to power source output 32 (connected to the workpiece) through the shunt 58. A second output from the rectifier can be provided to power source output 34 (connected to the electrode) through the power switching circuit 42.

The power switching circuit 42 switches electrical power from the rectifier 48 at a predetermined frequency to provide an electrical power output signal to the electrode 22 of the plasma cutting tool. In particular, the switching circuit 42 includes a switch 63 which switches on and off responsive to a switch drive signal 100 generated by the timing signal generator 80, the ramp generator 84, the comparator 86, and the switch drive 88. Accordingly, the duty cycle of the switch drive signal 100 determines the amount of time that the switch is on during a given switching period and thus the average electrical power switched to the electrode. Alternately, the switching circuit 42 and rectifier 48 can be combined, such as in a Silicon Controlled Rectifier circuit, for example.

Figure 5:
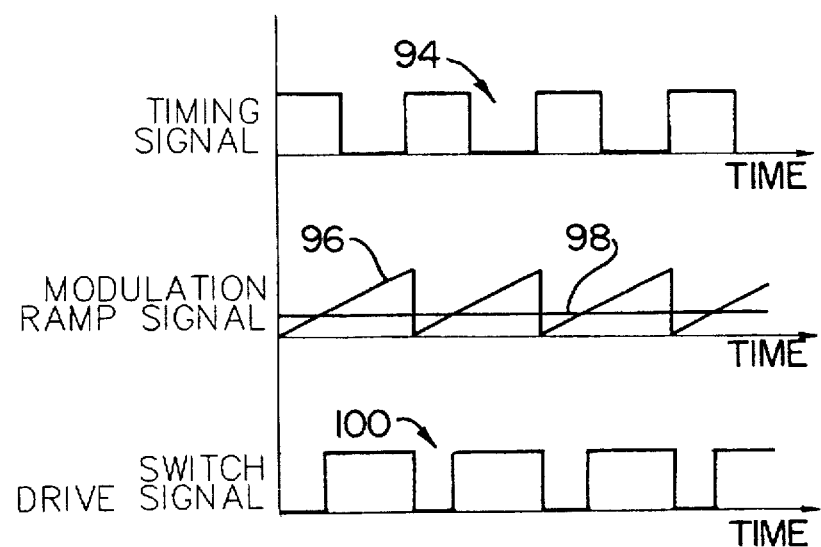
FIG. 5 is a timing diagram illustrating the timing of signals within the power switching circuit of FIG. 4.

The operations of the timing signal generator 80, the ramp generator 84, the comparator 86, and the switch drive 88 are illustrated in the timing diagrams of FIG. 5. The timing signal generator 80 generates a timing signal 94 with a constant frequency, such as 10 kHz. The ramp generator generates a modulation ramp signal 96 (a sawtooth waveform) which is reset with each rising edge of the timing signal 94. Accordingly, the modulation ramp signal 96 has the same frequency as the timing signal 94.

The comparator 86 compares the modulation ramp signal 96 with the input signal 98 which is generated by the feedback circuit 50 to produce the switch drive signal 100. As shown, the switch drive signal 100 is low when the input signal 98 is greater than the ramp modulation signal 96, and high when the ramp modulation signal 96 is greater than the input signal 98. The switch drive signal 100 can be further conditioned by the switch drive 88 before being applied to the gate of the switch 63. For example, the switch drive 88 can be used to boost or amplify the switch drive signal 100 as may be required by the switch 63.

Accordingly, as the magnitude of the input signal 98 changes relative to the fixed modulation ramp signal 96, the duty cycle of the switch drive signal 100 also changes. In particular, the duty cycle of the switch drive signal 100 increases as the magnitude of the input signal 98 decreases, and decreases as the magnitude of the input signal 98 increases. As the switch is on when the switch drive signal 100 is high, and off when the switch drive signal 100 is low, the duty cycle of switching increases as the input signal 98 decreases. Furthermore, when the magnitude of the input signal is equal to the lowest point of the modulation ramp signal, the switch will remain on and cease switching (power source saturation).

The power switching circuit 42 also includes a free wheeling diode 64, a current sensor 66, an inductor 68, and a blocking diode 70. The current sensor 66 is preferably a Hall Sensor which is used to provide a feedback signal to the feedback circuit 50. This sensor detects the output current through the power switching circuit 42. The free wheeling diode provides an electrical path from the switch 63 collector to the workpiece so that energy stored in the inductor 68 can be dissipated when the switch 63 is turned off. The blocking diode 70 in the power circuit can help isolate the switching circuit.

The feedback circuit 50 generates an input signal responsive to the feedback signal from the current sensor 66 of the power switching circuit 42, the VREF signal (representing the desired output for the power source) from the input circuit 56, a signal representing the current across shunt 58, and the switching cessation signal from the switching cessation detector 59. As shown, the input signal from the feedback circuit 50 is provided to the comparator 86 of the power switching circuit 42. During switching operations, the magnitude of the feedback signal from the current sensor 66 is proportional to the output current to the electrode. This signal is scaled by the scaling circuit 76 combined with an error signal at summing circuit 78 to correct any differences between the desired and actual power source output current to thereby generate the input signal.

The error signal is generated by the operational amplifier 74 which detects differences between the desired output (VREF from the input circuit 56) and the actual output (the current through shunt 58 as determined by the output sensor 72). The desired output signal VREF can be generated using a potentiometer 57 together with the input circuit 56 which generates a VREF signal ranging from 0 to 10 volts and is representative of the desired output for the power source 30. The VREF signal can alternately be provided by any signal source, such as an automatic control system for example. The input circuit 56 can also be used to provide a ramp up signal when the power switching circuit 42 first starts switching.

In particular, the operational amplifier 74 can determine a difference between the desired output current (represented by VREF) and the actual output current (current through shunt 58), and combine this difference with desired output current (VREF) to generate the error signal. Furthermore, the operational amplifier 74 can be reset so that the error signal is equal to the desired current output (VREF) in response to the initial condition circuit. Accordingly, the operational amplifier 74 can be reset during power source saturation, so that differences between the actual and desired outputs are not considered, thereby reducing overshoot when saturation subsides. Furthermore, when the operational amplifier is reset, the VREF signal can be attenuated by 20 percent, for example, to further reduce overshoot.

The shunt 58 is preferably a high-precision low-resistance resistor in the path of current to the electric arc. By sensing a voltage drop across the shunt 58, the output sensor 72 can determine a current through the electric arc and generate a signal which is also scaled to the range of 0 to 10 volts. The error signal generated by the operational amplifier 74 can thus be used to adjust the scaled feedback signal to more accurately maintain the desired output current for the power source.

When the power source goes into saturation (as a result of increased arc voltage usually caused by an increase in arc length), the current through the power switching circuit 42 will decrease even though the switch is turned on (at 100% duty cycle) and switching ceases, as discussed above. Accordingly, the difference between the desired and actual power source output will increase resulting in a larger error signal which has no immediate effect because the switching duty cycle is already at 100%. This large error signal, however, may result in significant output current overshoot if the arc length and thus arc voltage decrease. In order to reduce output current overshoot, the feedback circuit 50 includes means for resetting the error signal in response to the occurrence of power source saturation. In particular, the desired output signal (VREF) from potentiometer 57 can be passed through the operational amplifier 74 without compensating for error. In addition, the desired output signal (VREF) can be reduced by 20%, for example, by the operational amplifier 74 to further reduce overshoot. Accordingly, the potential of damage to the electric arc tool, and the workpiece 26 is reduced.

The switching cessation detector 59 detects that electrical current is being supplied to the electric arc 24 when the power switching circuit 42 ceases switching and generates a switching cessation signal in response thereto. Accordingly, the switching cessation signal indicates that the power source 30 is saturated and can thus also be referred to as a saturation signal. This signal is received by the initial condition circuit 79 which resets operational amplifier 74 thereby reducing the error signal. In particular, the error signal can be reset to the desired output signal VREF so that the difference between the desired and actual output is not considered.

In particular, an optically activated field effect transistor in the initial condition circuit 79 can be used to reset the operational amplifier 74 to the desired output signal VREF. In addition, the desired output signal can be reduced by approximately 20% to further reduce the potential for overshoot. The initial condition circuit 79 can also be used to suppress operation of the operational amplifier 74 when the power switching circuit 42 initially starts switching.

Preferably, the switching cessation detector 59 inhibits generation of the switching cessation signal until at least two consecutive switching periods have passed without switching. Accordingly, the occurrence of false switching cessation signals can be reduced. The cessation signal is preferably inhibited by including a timing circuit in the switching cessation detector 59. As shown in FIG. 4, the timing circuit can be implemented by including a resistor-capacitor timing circuit with resistor R and capacitor C in the step down circuit 102 which is discussed in detail below.

Once switching is reinitiated, the switching cessation signal can return to its inactive state allowing the initial condition circuit 79 and operational amplifier 74 to resume normal operation so that a difference between the actual and desired output is included in the error signal. Accordingly, if the saturation condition does not develop again, the cutting system 20 can continue operation. If the saturation condition reoccurs, the error signal can be reset again. Alternately, the operation of the power source can be halted after one or more occurrences of saturation over a predetermined period of time.

Figure 4:
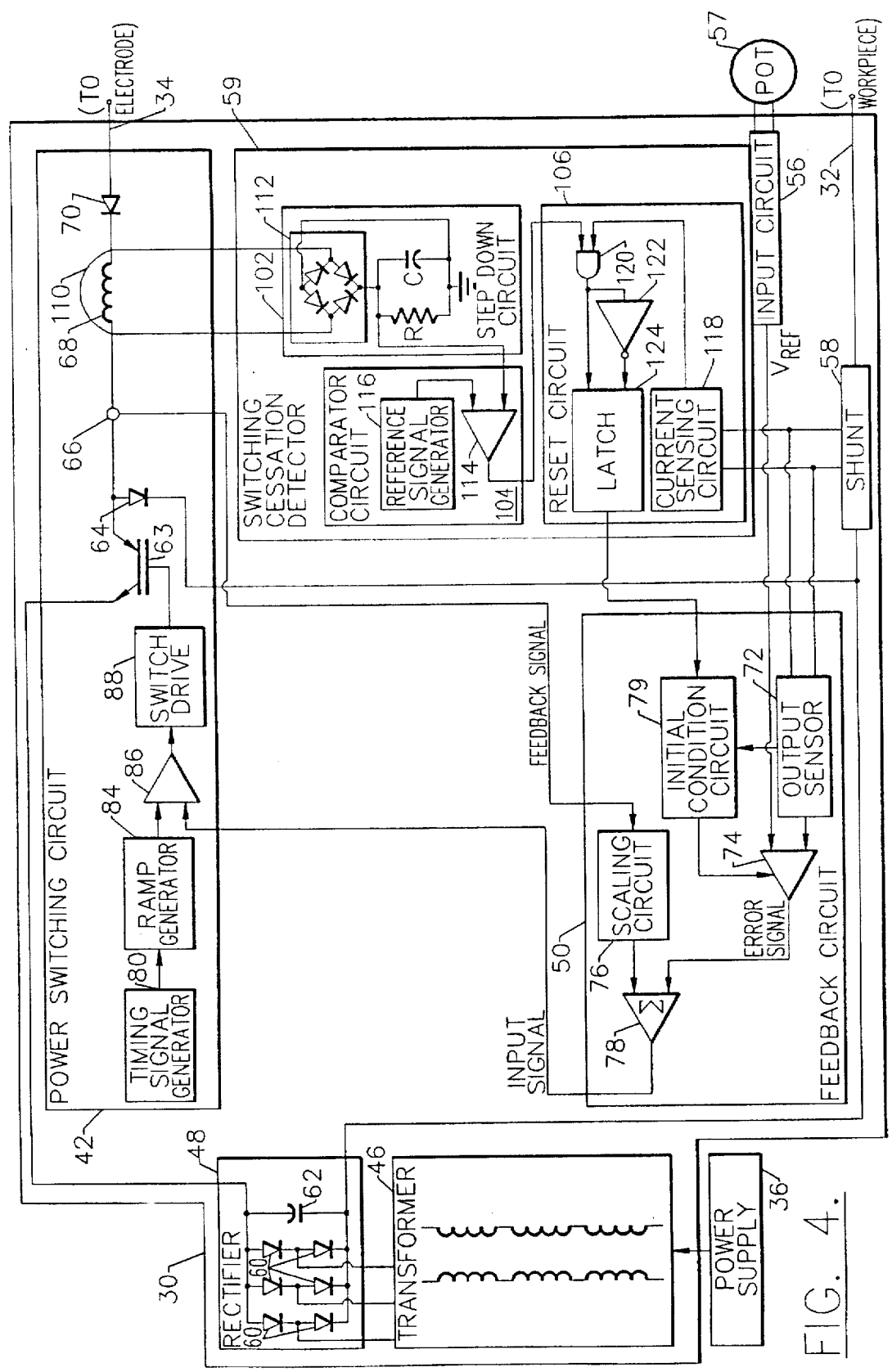
FIG. 4 is a circuit diagram of the power source of FIG. 3.

As best illustrated in FIG. 4, the switching cessation detector 59 can include a step down circuit 102, a comparator circuit 104, and a reset circuit 106. The step down circuit 102 can include one or more loops of wire 110 inductively coupled to the inductor 68 in the power switching circuit 42. As long as the switch 63 is switching, the electrical power through the switch 63 (and inductor 68) will have an AC component, and the wire 110 will generate an AC component signal in response to the AC component of the electrical power through the switch 63. The rectifying circuit 112 is coupled to the wire 110 and rectifies the AC component signal to responsively generate an AC component magnitude signal. Accordingly, as long as the 3-phase rectifier 48 provides a 300 volt DC output, and the switch 63 is switching from this 300 volt DC output, the step down circuit 102 will generate a measurable AC component magnitude signal. For example, by using 1 loop of wire for every 60 turns of the inductor 68, a 5 volt peak-to-peak AC component signal can be generated by the loop of wire 110 responsive to switching. When switching ceases, the AC component signal will go to about zero.

The step down circuit 102 can also include a resistor-capacitor timing circuit having a predetermined time constant. As shown, the capacitor C is charged with the AC component magnitude signal generated by the rectifying circuit 112, and the resistor R provides a resistive path to ground. Combined in parallel, the resistor and capacitor provide a timing circuit. For example, the resistor R can have a value of 10 kOhms and the capacitor C can have a value of 0.01 μF thereby providing an RC time constant of about 100 μs. Accordingly, upon cessation of switching, a 5 volt AC component magnitude signal will fall to approximately 1.9 volts after about 100 μs, approximately 0.7 volts after about 200 μs, and approximately 0.3 volts after about 300 μs.

The comparator circuit 104 includes the comparator 114 and the reference signal generator 116. The reference signal generator 116 generates a reference voltage signal and the comparator 114 compares this reference voltage signal with the output from the step down circuit 102. When the output from the step down circuit 102 falls below the reference voltage signal, the output from the comparator indicates that switching has ceased. In particular, if a reference voltage of about 0.439 volts is used with the RC timing circuit discussed above, a 5 volt AC component magnitude signal, and a 10 kHz switching frequency, at least two switching periods must pass without switching before the output of the comparator 114 will indicate that switching has ceased. Stated in other words, the generation of the switching cessation signal can be inhibited until at least two consecutive switching periods pass without switching. Accordingly, the generation of false switching cessation signals can be reduced.

The output from the comparator 114 is provided to the reset circuit 106 including AND gate 120, current sensing circuit 118, invertor 122, and a latch (such as an R-S flip-flop) 124. The current sensing circuit 118 determines if current is flowing through the shunt 58 (and therefor flowing through the electric arc 24). The signal from the comparator 114 is combined with the output from the current sensing circuit 118 at the AND gate 120. Thus, the output of the AND gate will not signal switching cessation unless there has been no switching for at least two switching periods and there is current flowing through the shunt 58.

The transition of the AND gate 120 from low to high triggers the latch 124 to generate the switching cessation signal which is provided to the initial condition circuit 79 as discussed above. When power source saturation subsides and switching is reinitiated, the AND gate 114 output transition from high to low can be inverted by the invertor 122 causing the latch to reset the switching cessation signal thus allowing the feedback circuit 50 to return to normal operation. Alternately, for example, the reset circuit 106 also can be configured so that the latch 124 can only be reset through operator intervention.

Figure 6:
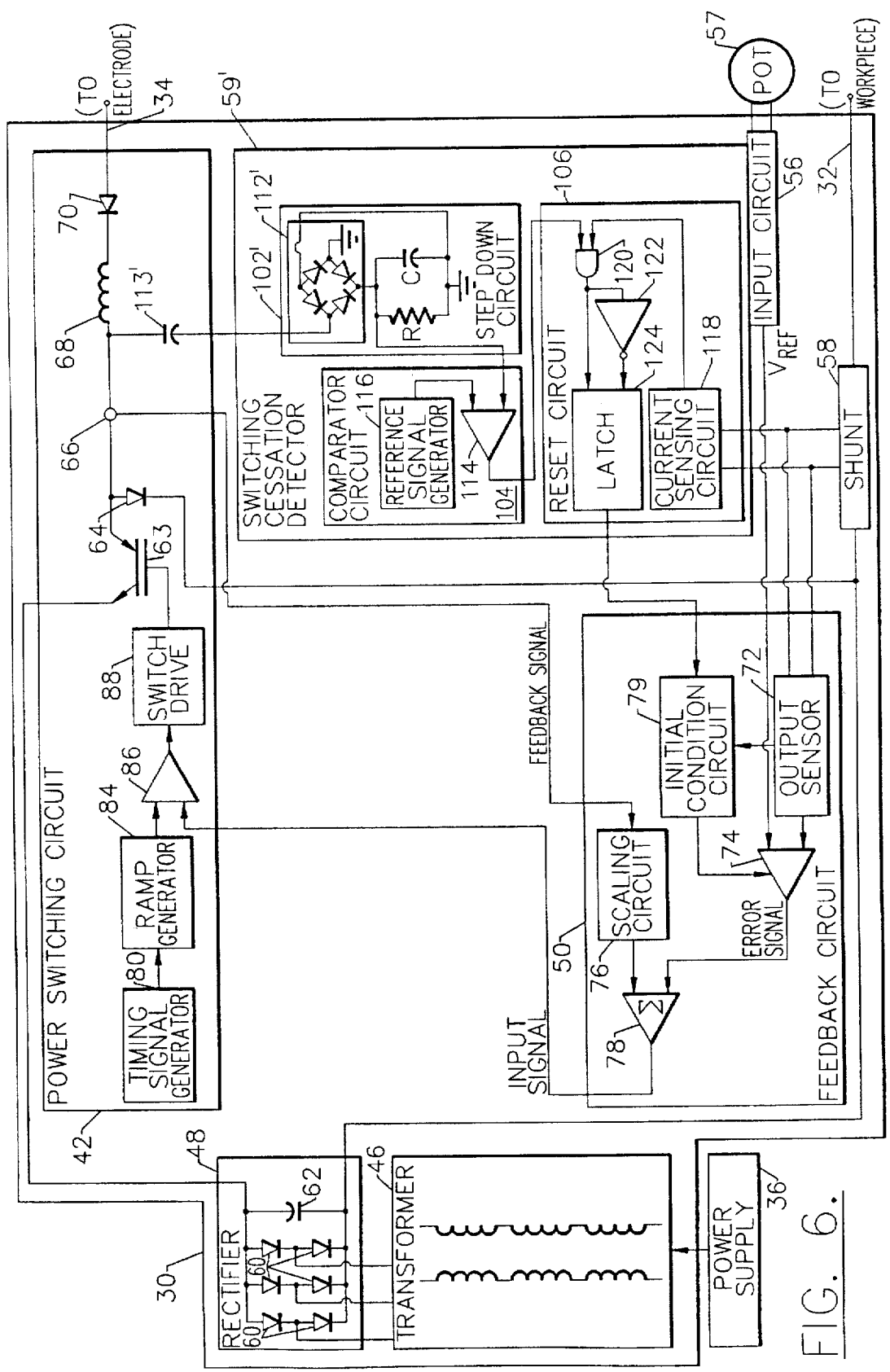
FIG. 6 is a circuit diagram of an alternative power source according to the present invention.
Figure 7:
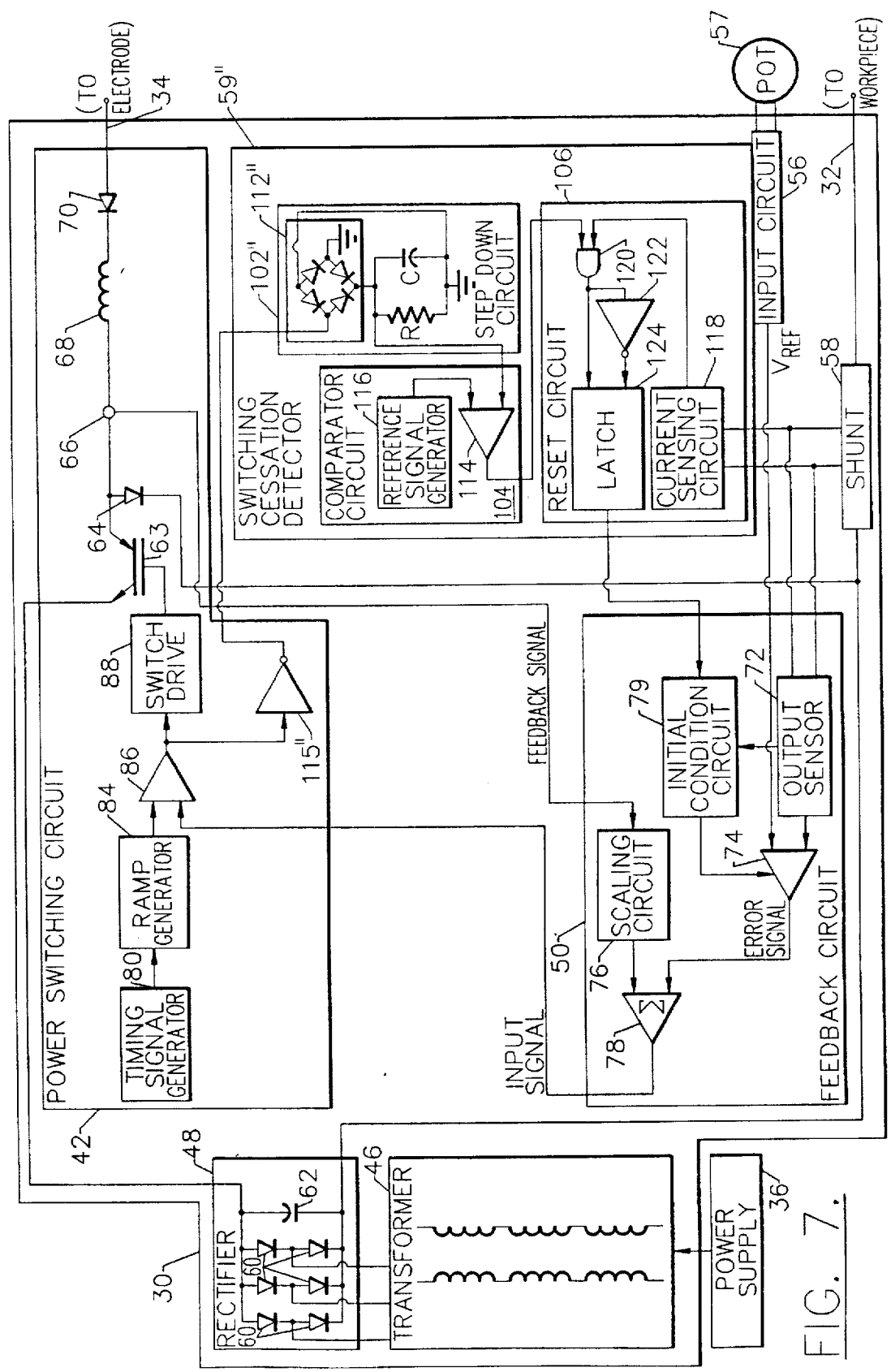
FIG. 7 is a circuit diagram of another alternative power source according to the present invention.

Alternative embodiments of the switching cessation detector 59 are illustrated in FIGS. 6 and 7. In each of these embodiments, the step down circuit of the switching cessation detector 59 is coupled to the power switching circuit 42 in a different manner. Other than these alternative couplings between the step down circuit and the power switching circuit, the embodiments of FIGS. 6 and 7 function like the embodiment of FIG. 4. In FIG. 6, the collector of the switch 63 is coupled to the rectifier 112' through the capacitor 113'. Accordingly, an AC component of the electrical power output signal is passed through the capacitor 113' to the rectifying circuit 112'. The output of the rectifying circuit 112' is provided to the RC timing circuit as discussed above with regard to FIG. 4.

In FIG. 7, the rectifier 112" is coupled to the output of the comparator 86 in the power switching circuit 42 by the buffer circuit 115". The buffer circuit 115" can also provide electrical isolation by including an optical isolating circuit. Furthermore, the buffer circuit 115" can be inverting. Accordingly, the switch drive signal generated by the comparator 86 is inverted so that when saturation occurs (the switch drive signal is always high) the inverting buffer circuit 115" will produce a low output causing the AC component magnitude signal at the RC timing circuit to decay. This configuration has the advantage that the input signal to the rectifying circuit 112" only goes to zero when switching has ceased with the switch 63 being on, and may thereby eliminate the need for the sensing circuit 118 and gate 120.

The switching cessation detectors discussed above thus allow the rapid detection of power source saturation while reducing the occurrence of false cessation signals. The cessation detectors also enable the power source 30 to quickly reset the error signal, thereby reducing current overshoot when saturation subsides. Accordingly, the impact of power source saturation on operation of arc welding and cutting systems can be reduced.

In the drawings and specification, there have been disclosed preferred embodiments of the invention, and, although specific terms are employed, they are used in a descriptive sense only and not for purposes of limitation. This invention has been described in considerable detail with specific reference to illustrated embodiments. It will be apparent, however, that various modifications and changes can be made within the spirit and scope of the invention as described in the foregoing specification and defined in the appended claims.

That which is claimed:

1. A power source for a welding or cutting system, the power source comprising:

a power switching circuit for switching electrical power to provide an electrical power output signal of the power source to an electric arc tool operatively coupled thereto;

a switching cessation detector responsive to said power switching circuit for detecting electrical power being supplied to an electric arc tool operatively coupled to the power source when said power switching circuit ceases switching and for generating a switching cessation signal responsive thereto; and overshoot reducing means responsive to said switching cessation signal for reducing excess current output from said power switching circuit upon resumption of switching.

2. A power source as defined in claim 1:

wherein said power switching circuit includes a switch for switching said electrical power at a predetermined switching frequency; and wherein said switching cessation detector includes timing means for inhibiting generation of said switching cessation signal until at least two consecutive switching periods have passed without switching.

3. A power source as defined in claim 2 wherein said switching cessation detector comprises means for generating an AC component magnitude signal responsive to an AC component of said switched electrical power, and wherein said timing means comprises a resistor-capacitor circuit coupled to said generating means, said resistor-capacitor circuit having a predetermined time constant so that said AC component magnitude signal only decays to a predetermined threshold level after at least two switching periods have passed without switching.

4. A power source as defined in claim 1 wherein said switching cessation detector comprises:

a step down circuit coupled to said power switching circuit for sensing an AC component of said switched electrical power and for generating an AC component magnitude signal responsive thereto;

a comparator coupled to said step down circuit for determining that said AC component magnitude signal is less than a predetermined threshold level;

a current sensing circuit for detecting that said power switching circuit is providing electrical current to an electric arc tool; and a cessation signal generator responsive to said comparator and said current sensing circuit for generating said switching cessation signal only when said AC component magnitude signal is less than said predetermined threshold and when said power switching circuit is providing electrical current to an electric arc tool.

5. A power source as defined in claim 4:

wherein said power switching circuit includes a switch for switching said electrical power at a predetermined frequency and an inductor connected in series with said switch; and wherein said step down circuit comprises,
at least one loop of wire inductively coupled to said inductor for generating an AC component signal responsive to said AC component of said switched electrical power, and
rectifying means coupled to said loop of wire for rectifying said AC component signal to generate said AC component magnitude signal.

6. A power source as defined in claim 4:

wherein said power switching circuit comprises a switch for switching said electrical power at a predetermined frequency; and wherein said step down circuit comprises,
a capacitor connected to said switch for generating an AC component signal responsive to said AC component of said switched electrical power, and
rectifying means coupled to said capacitor for rectifying said AC component signal to generate said AC component magnitude signal.

7. A power source as defined in claim 4:

wherein said power switching circuit comprises,
control means for generating a switch drive signal, and
a switch for switching said electrical power at a predetermined frequency responsive to said switch drive signal; and wherein said step down circuit comprises,
switch signal generating means coupled to said control means for generating a switch signal responsive to said switch drive signal, and
rectifying means coupled to said switch signal generating means for rectifying said switch signal to generate said AC component magnitude signal.

8. A power source as defined in claim 1 further comprising:

an error signal generator for generating an error signal responsive to a difference between a desired output signal for the power source and an actual output for the power source; and a feedback circuit for adjusting operation of said power switching circuit responsive to said error signal;

wherein said overshoot reducing means includes means responsive to said switching cessation signal for resetting said error signal to indicate an absence of error.

9. A method for controlling a power source for a cutting or welding system, the power source including a power switching circuit for switching electrical power to provide an electrical power signal to an electric arc tool operatively coupled to the power source, the method comprising the steps of:

detecting that the power switching circuit is providing electrical power to the electric arc tool and that the power switching circuit has ceased switching;

generating a switching cessation signal responsive to detecting that the power switching circuit has ceased switching and that the power switching circuit is providing electrical power to the electric arc tool; and reducing excess current output from said power switching circuit responsive to said switching cessation signal upon resumption of switching.

10. A method as defined in claim 9 wherein the power switching circuit includes a switch for switching the electrical power at a predetermined switching frequency, said generating step further comprising the step of:

inhibiting generation of said switching cessation signal until at least two consecutive switching periods have passed without switching.

11. A method as defined in claim 9 wherein said detecting step comprises the steps of:

sensing an AC component of the switched electrical power;

generating an AC component magnitude signal responsive to said sensed AC component of the switched electrical power;

determining that said AC component magnitude signal is less than a predetermined threshold level;

detecting that the power switching circuit is providing electrical current to the electric arc tool; and generating said switching cessation signal only when said AC component magnitude signal is less than said predetermined threshold and when the power switching circuit is providing electrical current to the electric arc tool.

12. A method as defined in claim 11 wherein the power switching circuit includes a switch for switching the electrical power at a predetermined frequency and an inductor connected in series with the switch, said sensing step further comprising the steps of:

inducing an AC component signal in a wire responsive to said AC component of the switched electrical power; and rectifying said AC component signal to generate said AC component magnitude signal.

13. A method as defined in claim 11 wherein the power switching circuit includes a switch for switching the electrical power at a predetermined frequency, said sensing step further comprising the steps of:

passing an AC component of the switched electrical power through a capacitor connected to the switch to provide an AC component signal; and rectifying said AC component signal to generate said AC component magnitude signal.

14. A method as defined in claim 11 wherein the power switching circuit includes a controller for generating a switch drive signal and a switch for switching the electrical power at a predetermined frequency responsive to the switch drive signal, said sensing step further comprising the steps of:

generating a switch signal responsive to the switch drive signal; and rectifying said switch signal to generate said AC component magnitude signal.

15. A method as defined in claim 11 further comprising the steps of:

generating an error signal responsive to a difference between a desired output signal for the power source and an actual output signal for the power source; and adjusting operation of said power switching circuit responsive to said error signal;

wherein said reducing step includes resetting said error signal responsive to said switching cessation signal to indicate an absence of error.

16. A power source for a welding or cutting system, the power source comprising;

power generating means for providing an electrical power output signal to an electric arc tool operatively coupled thereto;

a power source saturation detector, responsive to said power generating means, for determining that said power generating means is saturated by detecting that said power generating means cannot maintain a desired output current, and for generating a saturation signal responsive thereto; and overshoot reducing means responsive to said saturation signal for reducing excess current output from said power generating means when said power generating means emerges from saturation.

17. A power source as defined in claim 16 wherein said saturation detector includes timing means for inhibiting generation of said saturation signal until detecting that the desired output current cannot be maintained by said power generating means for a predetermined period of time.

18. A power source as defined in claim 17:

wherein said power generating means includes a switch for switching electrical power at a predetermined switching frequency; and wherein said predetermined period of time is equal to at least two switching periods.

19. A power source as defined in claim 16 further comprising:

feedback means responsive to said power generating means for generating an error signal responsive to a difference between a desired output and an actual output of said power generating means; and adjusting means for adjusting operation of said power generating means responsive to said error signal;

wherein said overshoot reducing means includes means responsive to said saturation signal for resetting said error signal to indicate an absence of error.

20. A power source for a welding or cutting system, the power source comprising:

power generating means for providing an electrical power output signal to an electric arc tool operatively coupled thereto, wherein said power generating means includes a switch for switching electrical power at a predetermined switching frequency;

a power source saturation detector responsive to said power generating means for detecting that a desired output current cannot be maintained by said power generating means and for generating a saturation signal responsive thereto, wherein said saturation detector comprises:

means for generating an AC component magnitude signal responsive to an AC component of said switched electrical power; and timing means for inhibiting generation of said saturation signal until detecting said reduction in said AC component for a predetermined period of time, said timing means comprising a resistor-capacitor circuit coupled to said generating means, wherein said resistor-capacitor circuit has a predetermined time constant that inhibits said AC component magnitude signal from reaching said predetermined threshold level until after at least two switching periods have passed without switching; and overshoot reducing means responsive to said saturation signal for reducing excess current output from said power generating means.

21. A power source for a welding or cutting system, the sower source comprising;

power generating means for providing an electrical power output signal to an electric arc tool operatively coupled thereto;

a power source saturation detector responsive to said power generating means for detecting that a desired output current cannot be maintained by said power generating means and for generating a saturation signal response thereto, wherein said saturation detector comprises:

a step down circuit coupled to said power generating means for sensing an AC component of said switched electrical power and for generating a AC component magnitude signal responsive thereto;

a comparator coupled to said step down circuit for determining that said AC component magnitude signal is less than said predetermined threshold;

a current sensing circuit for detecting that said power generating means is providing electrical current to an electric arc tool; and a cessation signal generator responsive to said comparator and said current sensing circuit for generating said saturation signal only when said AC component magnitude signal is less than said predetermined threshold and when said power generating means is providing electrical current to an electric arc tool; and overshoot reducing means responsive to said saturation signal for reducing excess current output from said power generating means.

22. A power source as defined in claim 21:

wherein said power generating means includes an inductor connected in series with said switch; and wherein said step down circuit comprises, at least one loop of wire inductively coupled to said inductor for generating an AC component signal responsive to said AC component of said electrical power output signal, and rectifying means coupled to said loop of wire for rectifying said AC component signal to generate said AC component magnitude signal.

23. A power source as defined in claim 21 wherein said step down circuit comprises:

a capacitor connected to said switch for generating an AC component signal responsive to said AC component of said electrical power output signal, and rectifying means coupled to said capacitor for rectifying said AC component signal to generate said AC component magnitude signal.

24. A power source as defined in claim 21:

wherein said power generating means comprises control means for generating a switch drive signal, and wherein said switch switches electrical power responsive to said switch drive signal; and wherein said step down circuit comprises, switch signal generating means coupled to said control means for generating a switch signal responsive to said switch drive signal, and rectifying means coupled to said switch signal generating means for rectifying said switch signal to generate said AC component magnitude signal.

* * * * *

UNITED STATES PATENT AND TRADEMARK OFFICE
CERTIFICATE OF CORRECTION

PATENT NO. : 5,756,963

DATED : May 26, 1998

INVENTOR(S) : Higgins

It is certified that error appears in the above-identified patent and that said Letters Patent is hereby corrected as shown below:

Column 13, line 24, "sower" should be --power--.

Signed and Sealed this

Twenty-fifth Day of August, 1998

Attest:

*Attesting Officer*

BRUCE LEHMAN

*Commissioner of Patents and Trademarks*